United States Patent
Gallay

[11] Patent Number: 5,511,686
[45] Date of Patent: Apr. 30, 1996

[54] CONTAINER MADE OF A SYNTHETIC MATERIAL AND METHOD FOR MAKING SAME

[75] Inventor: Pierre-Henri Gallay, Collonge-Bellerive, Switzerland

[73] Assignee: Jean Gallay S.A., Plans-les-Ouates, Switzerland

[21] Appl. No.: 150,025

[22] PCT Filed: Mar. 8, 1993

[86] PCT No.: PCT/CH93/00059

§ 371 Date: Nov. 9, 1993

§ 102(e) Date: Nov. 9, 1993

[87] PCT Pub. No.: WO93/17918

PCT Pub. Date: Sep. 16, 1993

[30] Foreign Application Priority Data

Mar. 12, 1992 [FR] France .................................. 92 03138

[51] Int. Cl.6 ...................................................... B65D 6/08
[52] U.S. Cl. ........................................... 220/667; 264/295

[58] Field of Search .................... 215/1 C, 666, 215/667, 6; 264/209.3, 209.1, 210.1, 295

[56] References Cited

FOREIGN PATENT DOCUMENTS 0472504  2/1992  European Pat. Off. .

Primary Examiner—Joseph M. Moy
Attorney, Agent, or Firm—Davis, Bujold & Streck

[57] ABSTRACT

A container made of a synthetic material, e.g., a bottle (10), comprising a closed bottom wall (11) and an opening (12) in the upper portion opposite the bottom wall. The container is produced according to a blow moulding, stretch blow moulding or thermoforming method, and its wall (9) comprises at least one fold line (13) consisting of a narrow linear area (13a) of said wall, in which the synthetic material has a different physical structure, whereby it is less plastically deformable but has at least as much tensile strength as the rest of the wall (9). This structural modification is obtained by mechanical or thermal processing or by exposure of the area in question to suitable particle radiation. The resulting bottle is readily foldable with a view to disposal after use.

36 Claims, 1 Drawing Sheet

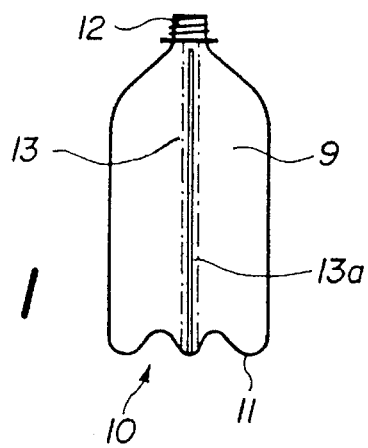
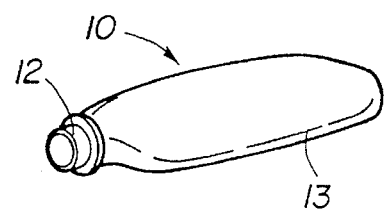
FIG. 1    FIG. 2
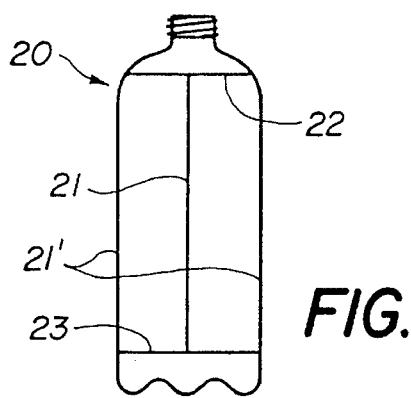
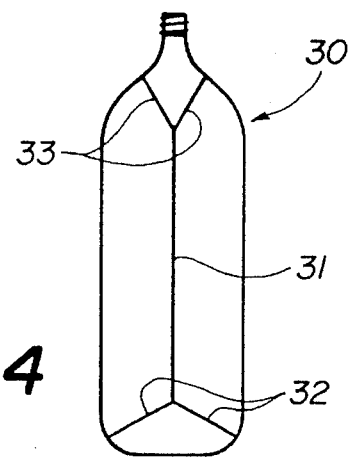
FIG. 3    FIG. 4
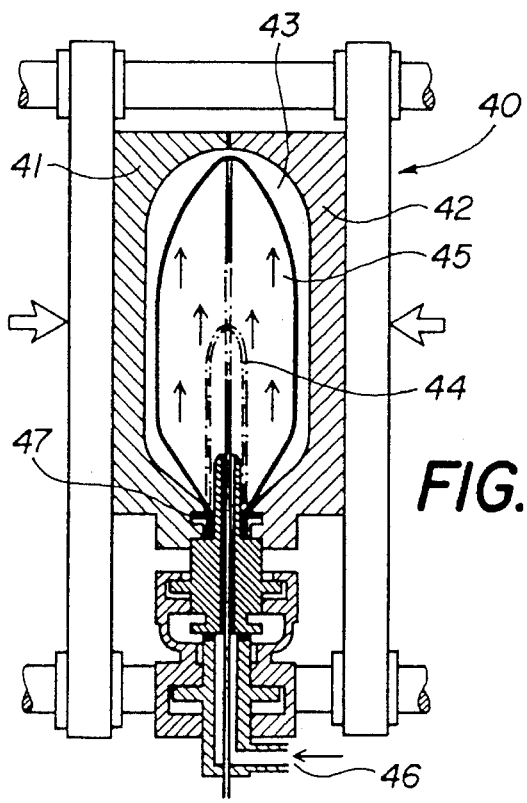
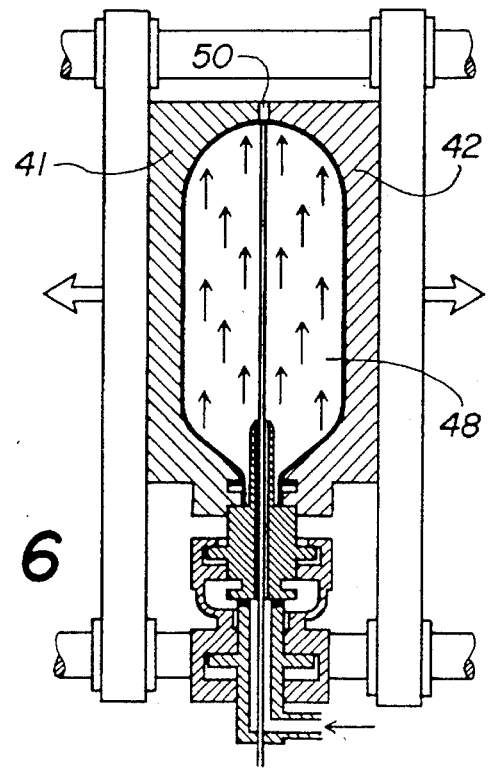
FIG. 5    FIG. 6

CONTAINER MADE OF A SYNTHETIC MATERIAL AND METHOD FOR MAKING SAME

BACKGROUND OF THE INVENTION

The present invention concerns a container made of synthetic material comprising a closed bottom wall and an opening in the upper portion opposite the bottom wall, and more specifically, a thermoplastic bottle made according to a blow molding, stretch blow molding or thermoforming method.

It also concerns a method for making a container of synthetic material comprising a closed bottom wall and an opening in the upper portion opposite the bottom wall, and more specifically, a thermoplastic bottle made by blow molding, stretch blow molding or thermoforming, said container having at least one fold line.

Currently, one of the most crucial problems in industrialized countries is collecting and disposing of waste, especially non-biodegradable waste such as, for example, a large variety of synthetic materials. Packaging material, especially thermoplastic bottles made of material such as polyethylene terephtalate (PET), comprises a large portion of such waste. These bottles and other containers currently used for carbonated or non-carbonated beverages and other liquids and powders, are extremely unyielding in spite of their relatively thin walls. They are difficult to break when empty and awkward, if not impossible, to flatten by folding. For this reason, they occupy considerable space in trash cans or other waste receptacles, resulting in enormous inconvenience and high disposal costs.

Thermoplastic containers for liquids, solids or powders at atmospheric pressure which have fold lines indicated by a sunken fold in the wall, sometimes in juxtaposition with two raised ridges which do not alter the thickness of the wall, have already been proposed. Other such containers have walls which are thinner along the fold lines (grooves) to facilitate folding along these lines.

In particular, European Publication No. 0 472 504 A2 describes a foldable container with fold lines made during the molding process which consist of grooves of reduced thickness, which in effect weaken the container in that area. This method does not change the internal structure of the material, but decreases resistance of the container walls considerably.

These existing packaging materials are generally made of polyolefins such as polyethylene and polypropylene and have several practical disadvantages and limitations. First, the containers with grooves have diminished tensile strength compared to the given mass of the entire container. Second, the containers with ridges along the fold lines which are not thinner than the wall are difficult to bend along the lines provided. Third, the reason the two types of containers described above do not lend themselves to easy bending by partially breaking the wall along the fold lines is that the material is highly plastic and the "deformation memory" of thermoplastic materials in this highly plastic state tends to cause the wall to unfold spontaneously. Fourth, the containers described above cannot be made of the highly resistant thermoplastic materials necessary, in particular, for packaging liquids under super-atmospheric pressure, such as, for example, carbonated beverages. Actually, containers made of such materials, PET for example, are even less easily bent and broken than the containers described above due to their high elasticity combined with a certain plastic deformability.

SUMMARY OF THE INVENTION

The present invention eliminates the disadvantages and limitations of containers known in the art with fold lines as described above and provides the further advantage of not requiring any modification in wall shape (such as ridges or grooves) along the fold lines; in addition, the fold lines are more readily visible and ensure precise, irreversible, convenient folding along only the fold lines, and there is no decrease in resistance before folding occurs.

To achieve this, the container according to the invention is characterized in that there is at least one fold line in the wall consisting of a narrow linear zone where the synthetic material has a different internal physical structure from that used throughout the remainder of the wall.

in this zone said synthetic material preferably has an internal physical structure which renders it less plastically deformable than the rest of the wall, but maintains at least the same tensile strength.

According to an advantageous embodiment the internal physical structure of said synthetic material may range from an amorphous structure to a crystalline structure. The synthetic material preferably has a more crystalline structure in said zone than in the rest of the wall.

Advantageously, said synthetic material is transparent throughout the wall but opaque in the more crystalline zone.

Preferably, the average thickness of said zone is less than that of the rest of the wall, having a ratio ranging from 1 and the ratio of tensile strength in said zone to that of the rest of the bottle.

In one particularly advantageous embodiment said synthetic material is terephtalate polyethylene which can be hardened by reticulation of the polymer chains which constitute it.

According to a first embodiment the fold line is longitudinal and at least partially disposed along a median plane of the container. It can also be transverse.

According to another embodiment, the longitudinal fold line is subdivided into at least two oblique segments near the base wall and/or the container opening.

In order to accomplish the desired result, the method according to the invention is characterized in that after the bottle has been at least partially formed, the internal physical structure of said material is modified within a narrow linear zone of the bottle wall which constitutes the fold line.

Preferably the physical structure of said material is modified by localized mechanical action within said zone.

The physical structure of said material may also be modified by localized thermal action within said zone or by localized exposure to radiation particles, photons or a chemical agent.

The material can be hardened by stretching when, after the container has been at least partially formed by stretch blow molding a preform, the material in said zone is hardened by localized supplemental stretching of the container wall in the zone constituting the fold line, transversely in relation to said line.

Said supplemental stretching process preferably takes place at a lower temperature than that used for stretch blow molding.

Said synthetic material can also be hardened by crystallization brought about by heating whereby, after the container is at least partially formed at one temperature, the wall temperature in the area limited to said zone is temporarily raised above the temperature at which the container is formed.

The synthetic material can also be hardened by reticulating the polymer chains comprising the material, whereby after the container is at least partially formed, the area limited to said zone is exposed to radiation particles, photons or a chemical agent capable of causing reticulation.

In one advantageous method, the container wall temperature is raised to a temperature permitting plastic deformation, said wall is maintained tightly against the surface of a mold cavity, consisting of at least two portions joined along a line corresponding to the fold line, by means of a fluid maintained at atmospheric pressure, the two mold portions are separated for a predetermined distance to cause localized supplemental stretching in the area of the fold line, the fluid pressure is lowered to atmospheric pressure, and the two mold portions are opened so the container can be removed.

In this embodiment of the method, the temperature at which plastic deformation of the container takes place is from 95 to 100° C., said superatmospheric pressure is from 10 to 60 bars and preferably between 35 and 45 bars, and the predetermined separation distance ranges from 0.5 to 5 mm and is preferably between 1 and 2 mm.

Advantageously, fluid at superatmospheric pressure temporarily maintains the container wall against the surface of said mold cavity before and/or after said predetermined separation for a duration ranging from 0.1 to 0.35 s before separation and from 0.1 to 2 s after separation.

In one embodiment of the method for manufacturing the container with said fold line, blow molding and stretching take place simultaneously using a preform brought to deformation temperature by means of said fluid maintained at superatmospheric pressure within said mold, the latter being maintained at a temperature lower than the container deformation temperature. The mold temperature ranges from 0 to 20° C. and preferably from 4 to 8° C.

Supplemental stretching and thermofixation of the entire bottle can also be accomplished simultaneously using fluid maintained at superatmospheric pressure in said mold, the latter being maintained at a temperature higher than the container temperature and ranging from 110 to 220° C. and preferably from 140 to 180° C.

In yet another embodiment of the method of the invention, the narrow linear zone may be swept with a concentrated beam of electromagnetic radiation emitted by a laser source in the wave length range of fron from ultraviolet to infrared, where the radiation extinction distance in the synthetic material comprising the container is less than four times the thickness of the container wall and preferably ranges from 0.002 to 1 times the thickness of the container wall.

The physical structure of the synthetic material in said zone can also be modified by local heating which is the result of sweeping the zone with a concentrated beam of 1R radiation, having a wave length of from 1.2 to 12 μm and emitted by a laser source, and by adjusting the speed and power of the beam so the temperature of the wall in said narrow linear area reaches a point which increases the degree of crystallization in the material, the wave length of said concentrated infrared radiation beam preferably ranging either from 10 to 12 μm or from 1.6 to 1.7 μm.

BRIEF DESCRIPTION OF THE DRAWINGS

The present invention will be better understood with reference to the description of one exemplary embodiment and to the attached drawing, wherein:

FIG. 1 is an elevation of the container according to the invention with a longitudinal fold line;

FIG. 2 is a perspective of the same container after folding along the fold line;

FIG. 3 is another embodiment of a container according to the invention which has transverse fold lines;

FIG. 4 is a different embodiment of a container having a longitudinal fold line which is subdivided near the base and near the opening;

FIG. 5 shows an initial phase in the manufacture of the container according to the invention; and FIG. 6 shows a final phase of the blow molding process which is part of the manufacturing method according to the invention.

DESCRIPTION OF THE PREFERRED EMBODIMENTS

With reference to FIG. 1, container 10, which is shown in the form of a thermoplastic bottle, comprises a base wall 11 and an opening 12 opposite said base wall and has, on wall 9, a fold line (foldable region) 13 disposed on a medial or axial plane. This fold line 13 is obtained by modifying the physical structure of the material from which the bottle is formed, for example, modifying it mechanically as will be described below in greater detail with reference to FIG. 5 and 6.

Depending upon the shape of the container, and especially its size relative to said opening, it may be produced either by thermoforming a flat preform, or by blow molding or stretch blow molding a hollow preform. In order to achieve a highly mechanically resistant container of reduced mass, thermoplastic material such as PET is advantageously used, a material whose physical structure can range from amorphous to crystalline. A highly mechanically resistant intermediate structure retaining the transparency of the material can be attained by submitting the material to considerable bi-axial elongation while the container is being formed, for example by stretch blow molding a preform and/or submitting the material to thermofixation after formation, which increases the degree of crystallization.

The physical structure of the material is modified only in the narrow zone 13a (enlarged in FIG. 1) of bottle wall 9 where fold line 13 will be located. This structural modification, which in this example consists of transforming the intermediate, transparent structure of the material utilized into a crystalline, opaque structure, can be obtained by mechanical or thermal action or by irradiating zone 13a, for example, with a laser beam. Modification of the physical structure also refers to a purely thermal or physio-chemical modification, such as, for example, transforming the reticulation connections of the polymer chains.

When mechanical action is utilized, zone 13a undergoes slight supplemental stretching in a direction perpendicular to the fold line, either during stretch blow molding of the preform or thereafter, and advantageously at a lower temperature than the temperature at which stretch blow molding takes place.

When thermal action is used, after the container has been formed, the synthetic material is hardened by a crystallization process during which zone 13a is raised to a temperature higher than the temperature at which formation takes place. This can be accomplished, for example, by temporarily placing one filament heated by an electrical current in the immediate proximity of the container wall along the fold line.

Irradiating zone 13a with particles, photons or suitable chemical agents also hardens the material in this zone by reticulation of the polymer chains comprising the material.

The structural transformations of the material in zone 13a make it harder and more fragile than the rest of wall 9, but maintain at least the same tensile strength. Thus, the tensile strength of the wall in zone 13a is not diminished, despite the fact that it is thinner. Resistance measurements have demonstrated this property. In actuality, it is only 10% thinner.

This ensures the integrity of the bottle's resistance to shocks as well as to the pressure of the liquid it holds. However, tensile strength and compression forces caused by bending the wall during folding are intensified in the folding zone 13a by a factor equal to the cube of the ratio of the thickness of wall 9 outside said zone to its thickness inside said zone. Therefore, when the wall is folded, it breaks neatly and only in the fold zone, which is harder and more fragile than the rest of the wall.

By virtue of the hardened, more fragile fold line the bottle is easily flattened (FIG. 2) when empty and can be stored in a trash can or other waste receptacle without occupying a large amount of space. PET Bottles presently in use are notoriously difficult to bend, as they have no fold line. It is actually very difficult to crease the walls of a container made of these materials as they also have a sort of shape memory, i.e., they tend to resume their original shape after having been creased.

As shown in FIGS. 3 and 4, the fold lines may be shaped differently, as they depend upon the particular container shape. In the case of container 20 shown in FIG. 3, a longitudinal fold line 21 is disposed on each side of the bottle in a median or axial plane. There might also be two other longitudinal fold lines 21 disposed in a median plane perpendicular to the plane passing through fold lines 21. In addition, a first transverse fold line 22 is located near the base wall of the bottle and a second transverse fold line 23 is located near the bottle opening.

In the case of bottle 30 shown in FIG. 4, one longitudinal fold line 31 is provided on each side of the bottle. Each of the fold lines is subdivided into two oblique lines 32 disposed near the base wall of the bottle and two other oblique lines 33 near the opening. For any given bottle, any possible combination of fold lines may be provided, such as, for example, one or more longitudinal fold lines 31 in combination with either two or more oblique lines 32, or two or more oblique lines 33. FIGS. 5 and 6 are schematic illustrations giving examples of one particular embodiment of the method of manufacturing containers according to the invention. This type of container is currently made by stretch blow molding a preform initially consisting of a preform which has been previously injection molded or compression molded. During a first phase the preform temperature is raised to a range in which the theology of the material is conducive to reorienting the molecular chains of the polymer and thereby reinforce it mechanically (partial microscopic crystallization). Next the preform is elongated in a bi-axial direction by stretch blow molding. For this purpose the preforms are introduced into a mold 40 consisting of two shells 41 and 42 defining a molding cavity 3 shaped like the container to be molded. The broken lines in FIG. 5 show a preform 44 which is inflated during the stretch blow molding process. The preform passes through an intermediate stage 45 shown by solid lines, during which compressed air is injected according to the arrow 46, through an injection nozzle 47 attached to the preform. The pressure of the air blowing on the container is maintained or increased so as to keep it firmly applied to the surface of cavity 43.

In the final phase of the stretch blow molding process, shown in FIG. 6, when the container has at least partially attained its ultimate dimensions 48, in order to create the fold line, the mold is opened slightly, that is, shells 41 and 42 are separated, thereby creating a space 50 between the shell edges. Since pressure inside the blow molded container is considerable, opening the mold causes supplemental stretching of the container wall along the line of the cavity opening at the junction of shells 41 and 42 and perpendicular to said line, thereby causing the material to crystallize within a narrow zone corresponding in width to said space 50, which may range from several tenths of a millimeter to several millimeters, and thus creates the fold line. This supplemental stretching takes place at nearly the same temperature as the mold surface temperature, which is lower than the temperature of the preform during stretch blow molding.

To reinforce tensile strength of the container, supplemental stretching and thermofixation can be performed simultaneously at a relatively high temperature, which may be approximately 100° C. This is actually the temperature at which recyled bottles are cleaned and beverages are pasteurized. Thermofixation is accomplished by temporarily raising the container temperature after stretch blow molding it in a first mold so as to develop crystallization without rendering it opaque, that is, a lesser degree of crystallization than that attained during the supplemental stretch blow molding in the fold zone.

It should be understood that in the example described, the fold line is a horizontal fold line disposed along a median plane of the container formed. In order to create fold lines disposed in several planes, one need merely make a mold comprised of several shells which can be separated in pairs during the final phase of the blow molding process.

Additionally, note that the method can be used not only for bottles, but also for other types of packaging such as, for example, containers for solid substances such as powders, granular material, tubes for paste such as food products, cosmetics, toothpaste, industrial paste such as grease, cleaning agents, etc. Many products in these categories are now packaged in metal or synthetic tubes which are difficult to bend and tend to resume their original shape. This problem can be resolved by applying the method of the invention to create a fold line in such packages. Therefore, such synthetic packaging material has general applications and may gradually replace conventional metal or plastic tubes.

I claim:

1. A container made of synthetic material comprising:

an elongate container wall being formed from a synthetic material;

said container being closed at bottom portion thereof and being open at an opposed upper portion thereof; and at least one elongate foldable region being formed in said container wall;

wherein said synthetic material forming said foldable region has a different molecular structure from said synthetic material which forms the remainder of said container wall thereby facilitating folding of said container along said foldable region when said container is flattened for disposal.

2. The container according to claim 1 wherein said synthetic material of said foldable region has a molecular structure which is less plastically deformable than the remainder of said container wall, but has at least the same tensile strength.

3. The container according to claim 1 wherein said synthetic material of said foldable region has a molecular structure ranging from an amorphous structure to a crystalline structure.

4. The container according to claim 3 wherein said synthetic material of said foldable region has a more crystalline structure in the remainder of said container wall.

5. The container according to claim 4 wherein said synthetic material of said foldable region is opaque and said synthetic material of the remainder of said container wall is transparent.

6. The container according to claim 2 wherein said average thickness of said foldable zone is less than the thickness of the remainder of said sidewall and has a ratio ranging from 1 to the ratio of the tensile strength of said wall to that of the remainder of the container.

7. The container according to claim 1 wherein said synthetic material is polyethylene terphetalate (PET).

8. The container according to claim 1 wherein said foldable region has a thickness of at least 90% of a thickness of the remainder of said container wall.

9. The container according to claim 2 wherein said synthetic material can be hardened by reticulation of polymer chains which comprise the synthetic material.

10. The container according to claim 1 wherein said foldable region is linear and at least partially disposed along a median plane of said container.

11. The container according to claim 1 wherein at least a portion of said foldable region is transverse of a median plane of said container.

12. The container according to claim 1 wherein said foldable region comprises at least one longitudinal fold line which is subdivided into at least two oblique segments near at least one end of said longitudinal fold line.

13. A method of making a container from a synthetic material, said container comprising an elongate container wall being formed from a synthetic material, said container being closed at a bottom portion thereof and being open at an opposed upper portion thereof, and at least one elongate foldable region being formed in said container wall such that said foldable region has a different molecular structure from the molecular structure of remainder of said container wall, said method comprising the steps of:
  a) partially forming a container by one of blow molding, stretch blow molding and thermo forming; and
  b) modifying said molecular structure of said synthetic material of said foldable region so that said molecular structure of said synthetic material of said foldable region is different from the molecular structure of said synthetic material of remainder of said container wall to facilitate folding of said container along said foldable region when said container is flattened for disposal.

14. The method according to claim 13 wherein said step of modifying said molecular structure of said synthetic material of said foldable region is achieved by localized mechanical action.

15. The method according to claim 13 wherein said step of modifying said molecular structure of said synthetic material of said foldable region is achieved by localized thermal action.

16. The method according to claim 13 wherein said step of modifying said molecular structure of said synthetic material of said foldable region is achieved by localized irradiation of said foldable region with one of particles and photons.

17. The method according to claim 14 further comprising the steps of hardening said synthetic material by stretching said foldable region and, after said container is at least partially formed by molding a preform, further hardening said synthetic material of said foldable region by local supplemental stretching of said container wall of said foldable region, which constitutes a fold line, in a direction transverse to said line.

18. The method according to claim 17 further comprising the step of supplemental stretching said foldable region at a temperature lower than the molding temperature.

19. The method according to claim 15 wherein, after the container is at least partially formed, said synthetic material of said foldable region is hardened by a crystallization process in which the temperature of said container wall of said foldable region is temporarily raised to a higher temperature than the temperature at which formation of said container occurs.

20. The method according to claim 16 wherein, after the container is at least partially formed, said synthetic material is hardened by reticulation of polymer chains which comprise said synthetic material by subjecting said foldable region to irradiation by one of particles and photons.

21. The method according to claim 17 further comprising the steps of:
  a) heating said container wall to a temperature to cause plastic deformation;
  b) maintaining said container wall firmly in contact with an inner surface of a mold cavity, consisting of at least two portions joined along a line corresponding to a fold line, by means of fluid maintained at superatmospheric pressure;
  c) separating the two mold portions a predetermined distance thereby resulting in localized supplemental stretching along the fold line;
  d) lowering the pressure of said fluid to atmospheric pressure; and
  e) opening the two portions of the mold and removing said container.

22. The method according to claim 21 further comprising the step of using a temperature ranging of from 95 to 100° C. as said temperature causing plastic deformation of said container.

23. The method according to claim 21 further comprising the step of using a pressure ranging of from 10 to 60 bars as said superatmospheric pressure.

24. The method according to claim 21 further comprising the step of using a distance ranging of from 0.5 to 5 mm as said predetermined separation distance.

25. The method according to claim 21 further comprising the step of using said fluid at superatmospheric pressure to temporarily maintain said container wall firmly against the inner surface of said mold cavity before and after separating the mold portions by said predetermined distance.

26. The method according to claim 25 further comprising the step of maintaining said container wall temporarily against the surface of said mold cavity for a duration of between 0.1 to 0.35 seconds before separation and between 0.1 to 2 seconds following separation.

27. The method according to claim 21 further comprising the step of raising the temperature of said preform and using said fluid at superatmospheric pressure to simultaneously mold and stretch said preform, and maintaining said fluid at superatmospheric pressure at a lower temperature than the temperature of said container.

28. The method according to claim 27 further comprising the step of using a mold temperature ranging from 0 to 20° C.

29. The method according to claim 21 further comprising the step of using said fluid at superatmospheric pressure to simultaneously supplemental stretch and thermo fix said container, and maintaining said fluid at superatmospheric pressure at a temperature higher than the container temperature.

30. The method according to claim 29 further comprising the step of using a mold temperature ranging from 140 to 180° C.

31. The method according to claim 13 further comprising the step of sweeping said foldable region with a beam of concentrated electromagnetic radiation emitted by a laser source having a wave length ranging from ultraviolet to infrared, and a radiation extinction distance of the synthetic material comprising said container is less than four times the thickness of the container wall.

32. The method according to claim 31 further comprising the step of using a range of from 0.002 to 1 times the thickness of said side wall as said radiation extinction distance.

33. The method according to claim 31 further comprising the step of sweeping said foldable region with a beam of concentrated infrared radiation with a wave length of from 1.2 to 12 μm, emitted by a laser source, to cause localized heating of said synthetic material, and adjusting a power and a speed of the beam to raise the temperature of the container wall of said foldable region to a temperature range which increases the degree of crystallization.

34. The method according to claim 33 further comprising the step of using a range of from 10 to 12 μm as said wave length of the concentrated infrared radiation beam.

35. The method according to claim 33 further comprising the step of using a range of from 1.6 to 1.7 μm as said wave length of the concentrated infrared radiation beam.

36. The method according to claim 15 further comprising the step of stretching said foldable region, during said supplemental stretching step, to reduce the thickness of the container wall of said foldable region by about 10%.

* * * * *